US007601059B2

(12) United States Patent
Bozeman

(10) Patent No.: US 7,601,059 B2
(45) Date of Patent: Oct. 13, 2009

(54) WORD-BASED LOTTERY GAME

(75) Inventor: Alan Kyle Bozeman, Alpharetta, GA (US)

(73) Assignee: Scientific Games International, Inc., Newark, DE (US)

( * ) Notice: Subject to any disclaimer, the term of this patent is extended or adjusted under 35 U.S.C. 154(b) by 0 days.

(21) Appl. No.: 11/336,673

(22) Filed: Jan. 20, 2006

(65) Prior Publication Data

US 2006/0178192 A1 Aug. 10, 2006

Related U.S. Application Data

(60) Provisional application No. 60/645,795, filed on Jan. 21, 2005.

(51) Int. Cl.
*A63F 9/24* (2006.01)
*A63F 13/00* (2006.01)
*G06F 17/00* (2006.01)
*G06F 19/00* (2006.01)

(52) U.S. Cl. .......................... 463/17; 463/10; 463/12; 463/16; 463/18; 463/19; 463/20; 273/272

(58) Field of Classification Search ............ 463/16–20, 463/10, 13, 12; 273/272
See application file for complete search history.

(56) References Cited

U.S. PATENT DOCUMENTS 1,527,929 A 2/1925 Simons
3,089,123 A 5/1963 Hennis et al.
3,195,895 A * 7/1965 Kropinski .................. 273/240
3,245,697 A 4/1966 Nugent
3,582,075 A * 6/1971 Glass et al. ................ 273/317
3,606,336 A * 9/1971 Krause ...................... 273/272
3,699,311 A 10/1972 Dunbar
3,736,368 A 5/1973 Vogelman et al.
3,826,499 A 7/1974 Lenkoff (Continued)

FOREIGN PATENT DOCUMENTS

AU B-18428/92 12/1992

(Continued)

OTHER PUBLICATIONS

National Scrabble Association, "NSA Tournament Rules". 1995. www.math.utoronto.ca/~jjchew/scrabble/rules/nsa.html. Obtained Aug. 1, 2007.*

(Continued)

*Primary Examiner*—John M Hotaling, II
*Assistant Examiner*—Adetokunbo Torimiro
(74) *Attorney, Agent, or Firm*—Dority & Manning, P.A.

(57) ABSTRACT

A method for hosting a word-based lottery game having a plurality of players is disclosed. A player selects a plurality of cells from a playslip and these cells will be converted to a plurality of letters and symbols by a lottery game machine. The player will use these letters and symbols along with one or more letter(s) drawn by the lottery to form words and compare these words with a list of words. For each formed word that is on the list, a point is awarded and extra bonus points may be awarded to some special words. The total points obtained by the player is compared with a prize table and the player is awarded a prize according to the prize table.

13 Claims, 12 Drawing Sheets

| Completed Words | Prize | 1/Probability |
|---|---|---|
| 6 | $7 | 11.3 |
| 7 | $10 | 23.4 |
| 8 | $50 | 109.0 |
| 9 | $500 | 1,227.6 |
| 10 or More | $100,000 | 99,382.8 |

U.S. PATENT DOCUMENTS

| | | | | | |
|---|---|---|---|---|---|
| 3,868,057 | A | | 2/1975 | Chavez | |
| 3,876,865 | A | | 4/1975 | Bliss | |
| 3,902,253 | A | | 9/1975 | Sabuzawa et al. | |
| 3,918,174 | A | | 11/1975 | Miller et al. | |
| 3,922,529 | A | | 11/1975 | Orloff | |
| 3,934,120 | A | | 1/1976 | Maymarev | |
| 4,017,834 | A | | 4/1977 | Cuttill et al. | |
| 4,095,824 | A | | 6/1978 | Bachman | |
| 4,105,156 | A | | 8/1978 | Dethloff | |
| 4,176,406 | A | | 11/1979 | Matkan | |
| 4,191,376 | A | | 3/1980 | Goldman et al. | |
| 4,194,296 | A | | 3/1980 | Pagnozzi et al. | |
| 4,195,772 | A | | 4/1980 | Nishimura | |
| 4,206,920 | A | | 6/1980 | Weatherford et al. | |
| 4,241,942 | A | | 12/1980 | Bachman | |
| 4,243,216 | A | | 1/1981 | Mazumber | |
| 4,273,362 | A | | 6/1981 | Carrier et al. | |
| 4,309,452 | A | | 1/1982 | Sachs | |
| 4,313,087 | A | | 1/1982 | Weitzen et al. | |
| 4,350,342 | A | * | 9/1982 | Barulich | 273/240 |
| 4,355,300 | A | | 10/1982 | Weber | |
| 4,375,666 | A | | 3/1983 | Buck et al. | |
| 4,398,708 | A | | 8/1983 | Goldman et al. | |
| 4,407,443 | A | | 10/1983 | McCorkle | |
| 4,451,759 | A | | 5/1984 | Heynisch | |
| 4,455,039 | A | | 6/1984 | Weitzen et al. | |
| 4,457,430 | A | | 7/1984 | Darling et al. | |
| 4,464,423 | A | | 8/1984 | LaBianca et al. | |
| 4,466,614 | A | | 8/1984 | Bachman et al. | |
| 4,488,646 | A | | 12/1984 | McCorkle | |
| 4,491,319 | A | | 1/1985 | Nelson | |
| 4,494,197 | A | | 1/1985 | Troy et al. | |
| 4,536,218 | A | | 8/1985 | Ganho | |
| 4,544,184 | A | | 10/1985 | Freund et al. | |
| 4,579,371 | A | | 4/1986 | Long et al. | |
| 4,591,189 | A | | 5/1986 | Holmen et al. | |
| 4,634,149 | A | | 1/1987 | Donovan | |
| 4,665,502 | A | | 5/1987 | Kreisner | |
| 4,669,729 | A | | 6/1987 | Solitt et al. | |
| 4,689,742 | A | | 8/1987 | Troy et al. | |
| 4,695,053 | A | * | 9/1987 | Vazquez et al. | 463/18 |
| 4,726,608 | A | | 2/1988 | Walton | |
| 4,736,109 | A | | 4/1988 | Dvorzsak | |
| 4,740,016 | A | | 4/1988 | Konecny et al. | |
| 4,760,247 | A | | 7/1988 | Keane et al. | |
| 4,763,927 | A | | 8/1988 | Schneider | |
| 4,775,155 | A | | 10/1988 | Lees | |
| 4,792,667 | A | | 12/1988 | Chen | |
| 4,805,907 | A | | 2/1989 | Hagiwara | |
| 4,817,951 | A | | 4/1989 | Crouch et al. | |
| 4,835,624 | A | | 5/1989 | Black et al. | |
| 4,836,546 | A | | 6/1989 | Dire et al. | |
| 4,836,553 | A | | 6/1989 | Suttle et al. | |
| 4,837,728 | A | | 6/1989 | Barrie et al. | |
| 4,856,787 | A | | 8/1989 | Itkis | |
| 4,861,041 | A | | 8/1989 | Jones et al. | |
| 4,870,260 | A | | 9/1989 | Niepolomski et al. | |
| 4,880,964 | A | | 11/1989 | Donahue | |
| 4,888,244 | A | | 12/1989 | Masubuchi et al. | |
| 4,891,775 | A | * | 1/1990 | McWherter | 463/22 |
| 4,922,522 | A | | 5/1990 | Scanlon | |
| 4,923,199 | A | * | 5/1990 | Hahn | 273/299 |
| 4,943,090 | A | | 7/1990 | Fienberg | |
| 4,960,611 | A | | 10/1990 | Fujisawa et al. | |
| 4,961,578 | A | | 10/1990 | Chateau | |
| 4,964,642 | A | | 10/1990 | Kamille | |
| 4,996,705 | A | | 2/1991 | Entenmann et al. | |
| 4,998,010 | A | | 3/1991 | Chandler et al. | |
| 4,998,199 | A | | 3/1991 | Tashiro et al. | |
| 5,032,708 | A | | 7/1991 | Comerford et al. | |
| 5,033,744 | A | * | 7/1991 | Bridgeman et al. | 463/13 |
| 5,037,099 | A | | 8/1991 | Burtch | |
| 5,046,737 | A | | 9/1991 | Fienberg | |
| 5,069,453 | A | * | 12/1991 | Koza et al. | 463/17 |
| 5,074,566 | A | | 12/1991 | Desbiens | |
| 5,083,815 | A | | 1/1992 | Scrymgeour et al. | |
| 5,092,598 | A | | 3/1992 | Kamille | |
| 5,094,458 | A | | 3/1992 | Kamille | |
| 5,100,139 | A | | 3/1992 | Di Bella | |
| 5,109,153 | A | | 4/1992 | Johnson et al. | |
| 5,112,050 | A | * | 5/1992 | Koza et al. | 463/17 |
| 5,116,049 | A | | 5/1992 | Sludikoff et al. | |
| 5,118,109 | A | | 6/1992 | Gumina | |
| 5,119,295 | A | | 6/1992 | Kapur | |
| 5,158,293 | A | | 10/1992 | Mullins | |
| 5,165,967 | A | | 11/1992 | Theno et al. | |
| 5,186,463 | A | | 2/1993 | Marin et al. | |
| 5,189,292 | A | | 2/1993 | Batterman et al. | |
| 5,193,815 | A | | 3/1993 | Pollard | |
| 5,193,854 | A | | 3/1993 | Borowski, Jr. et al. | |
| 5,228,692 | A | | 7/1993 | Carrick et al. | |
| 5,232,221 | A | | 8/1993 | Sludikoff et al. | |
| 5,234,798 | A | | 8/1993 | Heninger et al. | |
| 5,249,801 | A | | 10/1993 | Jarvis | |
| 5,259,616 | A | | 11/1993 | Bergmann | |
| 5,273,281 | A | | 12/1993 | Lovell | |
| 5,276,980 | A | | 1/1994 | Carter et al. | |
| 5,282,620 | A | | 2/1994 | Keesee | |
| 5,308,992 | A | | 5/1994 | Crane et al. | |
| 5,317,135 | A | | 5/1994 | Finocchio | |
| 5,326,104 | A | | 7/1994 | Pease et al. | |
| 5,332,219 | A | | 7/1994 | Marnell, II et al. | |
| 5,342,047 | A | | 8/1994 | Hiedel et al. | |
| 5,342,049 | A | | 8/1994 | Wichinsky et al. | |
| 5,344,144 | A | | 9/1994 | Canon | |
| 5,346,258 | A | | 9/1994 | Behn et al. | |
| 5,380,007 | A | | 1/1995 | Travis et al. | |
| 5,393,057 | A | | 2/1995 | Marnell, II et al. | |
| 5,401,024 | A | | 3/1995 | Simunek | |
| 5,401,541 | A | | 3/1995 | Simunek | |
| 5,403,039 | A | | 4/1995 | Borowski, Jr. et al. | |
| 5,407,199 | A | | 4/1995 | Gumina | |
| 5,420,406 | A | | 5/1995 | Izawa et al. | |
| 5,432,005 | A | | 7/1995 | Tanigami et al. | |
| 5,451,052 | A | | 9/1995 | Behm et al. | |
| 5,453,602 | A | | 9/1995 | Hanada | |
| 5,456,465 | A | | 10/1995 | Durham | |
| 5,471,039 | A | | 11/1995 | May | |
| 5,471,040 | A | | 11/1995 | May | |
| 5,475,205 | A | | 12/1995 | Behm et al. | |
| 5,486,005 | A | | 1/1996 | Neal | |
| 5,513,846 | A | | 5/1996 | Niederlien et al. | |
| 5,528,154 | A | | 6/1996 | Leichner et al. | |
| 5,536,016 | A | | 7/1996 | Thompson | |
| 5,540,442 | A | | 7/1996 | Orselli et al. | |
| 5,548,110 | A | | 8/1996 | Storch et al. | |
| 5,550,746 | A | | 8/1996 | Jacobs | |
| 5,558,328 | A | * | 9/1996 | Krantz | 273/146 |
| 5,560,610 | A | | 10/1996 | Behm et al. | |
| 5,564,700 | A | | 10/1996 | Celona | |
| 5,564,977 | A | | 10/1996 | Algie | |
| 5,591,956 | A | | 1/1997 | Longacre, Jr. et al. | |
| 5,599,046 | A | | 2/1997 | Behm et al. | |
| 5,602,381 | A | | 2/1997 | Hoshino et al. | |
| 5,621,200 | A | | 4/1997 | Irwin et al. | |
| 5,628,684 | A | | 5/1997 | Bouedec | |
| 5,630,753 | A | | 5/1997 | Fuchs | |
| 5,651,735 | A | | 7/1997 | Baba | |
| 5,655,961 | A | | 8/1997 | Acres et al. | |
| 5,657,994 | A | * | 8/1997 | O'Connor | 273/299 |
| 5,667,250 | A | | 9/1997 | Behm et al. | |
| 5,682,819 | A | | 11/1997 | Beatty | |
| 5,690,366 | A | | 11/1997 | Luciano | |
| 5,704,647 | A | | 1/1998 | Desbiens | |

| | | | | |
|---|---|---|---|---|
| 5,722,891 | A | 3/1998 | Inoue | |
| 5,726,898 | A | 3/1998 | Jacobs | |
| 5,732,948 | A | 3/1998 | Yoseloff | |
| 5,741,183 | A | 4/1998 | Acres et al. | |
| 5,743,800 | A | 4/1998 | Huard et al. | |
| 5,752,882 | A | 5/1998 | Acres et al. | |
| 5,756,220 | A | 5/1998 | Hoshino et al. | |
| 5,768,142 | A | 6/1998 | Jacobs | |
| 5,769,421 | A * | 6/1998 | Wakefield | 273/272 |
| 5,769,458 | A | 6/1998 | Carides et al. | |
| 5,770,533 | A | 6/1998 | Franchi | |
| 5,772,509 | A | 6/1998 | Weiss | |
| 5,772,510 | A | 6/1998 | Roberts | |
| 5,772,511 | A | 6/1998 | Smeltzer | |
| RE35,684 | E | 7/1998 | Weingardt | |
| 5,779,840 | A | 7/1998 | Boris | |
| 5,789,459 | A | 8/1998 | Inagaki et al. | |
| 5,791,990 | A | 8/1998 | Schroeder et al. | |
| 5,797,794 | A | 8/1998 | Angell | |
| 5,803,504 | A | 9/1998 | Deshiens et al. | |
| 5,816,920 | A | 10/1998 | Hanai | |
| 5,818,019 | A | 10/1998 | Irwin, Jr. et al. | |
| 5,820,459 | A | 10/1998 | Acres et al. | |
| 5,823,874 | A | 10/1998 | Adams | |
| 5,830,063 | A | 11/1998 | Byrne | |
| 5,830,066 | A | 11/1998 | Goden et al. | |
| 5,830,067 | A | 11/1998 | Graves et al. | |
| 5,833,537 | A | 11/1998 | Barrie | |
| 5,835,576 | A | 11/1998 | Katz et al. | |
| 5,836,086 | A | 11/1998 | Elder | |
| 5,836,817 | A | 11/1998 | Acres et al. | |
| 5,848,932 | A | 12/1998 | Adams | |
| 5,863,075 | A | 1/1999 | Rich et al. | |
| 5,871,398 | A | 2/1999 | Schneier et al. | |
| 5,876,284 | A | 3/1999 | Acres et al. | |
| 5,882,261 | A | 3/1999 | Adams | |
| 5,883,537 | A | 3/1999 | Luoni et al. | |
| 5,885,158 | A | 3/1999 | Torango et al. | |
| 5,887,906 | A | 3/1999 | Sultan | |
| 5,903,340 | A | 5/1999 | Lawandy et al. | |
| 5,911,418 | A | 6/1999 | Adams | |
| 5,915,588 | A | 6/1999 | Stoken et al. | |
| 5,921,864 | A * | 7/1999 | Walker et al. | 463/9 |
| 5,934,671 | A | 8/1999 | Harrison | |
| 5,970,143 | A | 10/1999 | Shneier et al. | |
| 5,979,894 | A | 11/1999 | Alexoff | |
| 5,996,997 | A | 12/1999 | Kamille | |
| 5,997,044 | A | 12/1999 | Behm et al. | |
| 6,004,207 | A | 12/1999 | Wilson, Jr. et al. | |
| 6,004,208 | A | 12/1999 | Wilson, Jr. et al. | |
| 6,007,162 | A | 12/1999 | Hinz et al. | |
| 6,012,982 | A | 1/2000 | Piechowiak et al. | |
| 6,014,819 | A | 1/2000 | Maddix et al. | |
| 6,017,032 | A | 1/2000 | Grippo et al. | |
| 6,024,641 | A | 2/2000 | Sarno | |
| 6,033,307 | A | 3/2000 | Vancura et al. | |
| 6,053,405 | A | 4/2000 | Irwin, Jr. et al. | |
| 6,077,162 | A | 6/2000 | Weiss | |
| 6,080,062 | A | 6/2000 | Olson | |
| 6,086,477 | A | 7/2000 | Walker et al. | |
| 6,089,978 | A | 7/2000 | Adams | |
| 6,099,407 | A | 8/2000 | Parker, Jr. et al. | |
| 6,102,400 | A | 8/2000 | Scott et al. | |
| 6,107,913 | A | 8/2000 | Gatto et al. | |
| 6,119,364 | A | 9/2000 | Elder | |
| 6,125,368 | A | 9/2000 | Bridge et al. | |
| 6,142,872 | A | 11/2000 | Walker et al. | |
| 6,146,272 | A | 11/2000 | Walker et al. | |
| 6,149,521 | A | 11/2000 | Sanduski | |
| 6,155,491 | A | 12/2000 | Dueker et al. | |
| 6,168,439 | B1 * | 1/2001 | Anderson | 434/167 |
| 6,168,521 | B1 | 1/2001 | Luciano et al. | |
| 6,168,522 | B1 | 1/2001 | Walker et al. | |
| 6,179,710 | B1 | 1/2001 | Sawyer et al. | |
| 6,203,430 | B1 | 3/2001 | Walker et al. | |
| 6,206,373 | B1 | 3/2001 | Garrod | |
| 6,210,275 | B1 | 4/2001 | Olsen | |
| 6,217,448 | B1 | 4/2001 | Olsen | |
| 6,220,961 | B1 | 4/2001 | Keane et al. | |
| 6,224,055 | B1 | 5/2001 | Walker et al. | |
| 6,227,969 | B1 | 5/2001 | Yoseloff | |
| 6,238,288 | B1 | 5/2001 | Walker et al. | |
| 6,241,246 | B1 * | 6/2001 | Guttin et al. | 273/139 |
| 6,273,817 | B1 * | 8/2001 | Sultan | 463/17 |
| 6,309,300 | B1 | 10/2001 | Glavich | |
| 6,312,334 | B1 | 11/2001 | Yoseloff | |
| 6,315,291 | B1 | 11/2001 | Moody | |
| 6,330,976 | B1 | 12/2001 | Dymetman et al. | |
| 6,331,143 | B1 | 12/2001 | Yoseloff | |
| 6,334,814 | B1 | 1/2002 | Adams | |
| 6,340,158 | B2 | 1/2002 | Pierce et al. | |
| 6,368,213 | B1 | 4/2002 | McNabola | |
| 6,375,568 | B1 | 4/2002 | Roffman et al. | |
| 6,378,868 | B1 * | 4/2002 | La Bossiere | 273/272 |
| 6,379,742 | B1 | 4/2002 | Behm et al. | |
| 6,394,899 | B1 | 5/2002 | Walker et al. | |
| 6,398,214 | B1 | 6/2002 | Moteki et al. | |
| 6,398,643 | B1 | 6/2002 | Knowles et al. | |
| 6,398,644 | B1 | 6/2002 | Perrie et al. | |
| 6,398,645 | B1 | 6/2002 | Yoseloff | |
| 6,416,408 | B2 | 7/2002 | Tracy et al. | |
| 6,419,579 | B1 | 7/2002 | Bennett | |
| 6,428,412 | B1 * | 8/2002 | Anderson et al. | 463/9 |
| 6,435,408 | B1 | 8/2002 | Irwin, Jr. et al. | |
| 6,435,500 | B2 | 8/2002 | Gumina | |
| 6,435,504 | B1 * | 8/2002 | Nightingale | 273/272 |
| 6,478,677 | B1 | 11/2002 | Moody | |
| 6,491,215 | B1 | 12/2002 | Irwin, Jr. et al. | |
| 6,497,408 | B1 | 12/2002 | Walker et al. | |
| 6,552,290 | B1 | 4/2003 | Lawandy | |
| 6,220,596 | B1 | 7/2003 | Walker et al. | |
| 6,588,747 | B1 | 7/2003 | Seelig | |
| 6,595,855 | B2 * | 7/2003 | Sako | 463/29 |
| 6,599,186 | B1 | 7/2003 | Walker et al. | |
| 6,601,772 | B1 | 8/2003 | Rubin et al. | |
| 6,604,997 | B2 * | 8/2003 | Saidakovsky et al. | 463/9 |
| 6,637,747 | B1 | 10/2003 | Garrod | |
| 6,648,735 | B2 | 11/2003 | Miyashita et al. | |
| 6,648,753 | B1 | 11/2003 | Tracy et al. | |
| 6,648,755 | B1 | 11/2003 | Luciano et al. | |
| 6,676,126 | B1 | 1/2004 | Walker et al. | |
| 6,685,561 | B2 * | 2/2004 | Anderson et al. | 463/16 |
| 6,692,354 | B2 | 2/2004 | Tracy et al. | |
| 6,702,047 | B2 | 3/2004 | Huber | |
| 6,769,692 | B1 * | 8/2004 | Cavalluzzo | 273/272 |
| 6,773,345 | B2 | 8/2004 | Walker et al. | |
| 6,776,337 | B2 | 8/2004 | Irwin, Jr. et al. | |
| 6,786,824 | B2 | 9/2004 | Cannon | |
| 6,823,874 | B2 | 11/2004 | Lexcen | |
| 6,875,105 | B1 | 4/2005 | Behm et al. | |
| 6,889,978 | B2 * | 5/2005 | Schaefer et al. | 273/139 |
| 6,929,186 | B2 | 8/2005 | Lapstun | |
| 6,966,556 | B1 * | 11/2005 | Culley et al. | 273/272 |
| 7,229,350 | B2 * | 6/2007 | Baerlocher et al. | 463/20 |
| 2001/0027130 | A1 | 10/2001 | Namba et al. | |
| 2001/0030978 | A1 | 10/2001 | Holloway et al. | |
| 2001/0033689 | A1 | 10/2001 | Meder | |
| 2001/0034262 | A1 | 10/2001 | Banyai | |
| 2001/0040345 | A1 | 11/2001 | Au-Yeung | |
| 2002/0022511 | A1 | 2/2002 | Eklund et al. | |
| 2002/0084335 | A1 | 7/2002 | Ericson | |
| 2002/0119812 | A1 * | 8/2002 | Letang | 463/9 |
| 2002/0171201 | A1 | 11/2002 | Au-Yeung | |
| 2002/0187825 | A1 | 12/2002 | Tracy et al. | |
| 2003/0050109 | A1 | 3/2003 | Caro et al. | |
| 2003/0114210 | A1 | 6/2003 | Meyer et al. | |

| | | | | |
|---|---|---|---|---|
| 2003/0201605 | A1* | 10/2003 | Badger | 273/272 |
| 2004/0076310 | A1 | 4/2004 | Hersch et al. | |
| 2004/0173965 | A1 | 9/2004 | Stanek | |
| 2004/0178582 | A1 | 9/2004 | Garrod | |
| 2004/0185931 | A1 | 9/2004 | Hartman et al. | |
| 2004/0204222 | A1 | 10/2004 | Roberts | |
| 2004/0242308 | A1* | 12/2004 | Gray | 463/17 |
| 2004/0259631 | A1 | 12/2004 | Katz et al. | |
| 2004/0266514 | A1 | 12/2004 | Penrice | |
| 2005/0003884 | A1* | 1/2005 | Meyer et al. | 463/17 |
| 2005/0054415 | A1* | 3/2005 | Kaminkow et al. | 463/16 |
| 2005/0059465 | A1* | 3/2005 | Bozeman | 463/18 |
| 2005/0085289 | A1* | 4/2005 | Bozeman | 463/17 |
| 2005/0261044 | A1* | 11/2005 | Persidsky | 463/9 |
| 2005/0285336 | A1* | 12/2005 | Ilievski | 273/143 R |

FOREIGN PATENT DOCUMENTS

| | | | |
|---|---|---|---|
| AU | B-21070/92 | | 7/1993 |
| AU | A-50327/96 | | 2/1997 |
| AU | B-52499/96 | | 2/1997 |
| AU | 199716432 | B2 | 9/1997 |
| AU | A-45403/97 | | 4/1998 |
| AU | A-63553/98 | | 10/1998 |
| DE | 2938307 | C2 | 4/1981 |
| DE | 3035898 | A1 | 4/1982 |
| DE | 3035947 | A1 | 5/1982 |
| DE | 2938307 | C3 | 6/1982 |
| DE | 29803107 | U1 | 8/1988 |
| DE | 3822636 | A1 | 1/1990 |
| DE | 2938307 | C3 | 8/1990 |
| DE | 3822636 | A1 | 1/1992 |
| DE | 3415114 | A1 | 10/1995 |
| DE | 19646956 | C1 | 5/1998 |
| DE | 19706286 | A1 | 5/1998 |
| DE | 29816453 | U1 | 4/1999 |
| DE | 19751746 | A1 | 5/1999 |
| EP | 0122902 | B1 | 4/1984 |
| EP | 0333934 | A1 | 9/1989 |
| EP | 0458623 | | 11/1991 |
| EP | 0798676 | A1 | 10/1997 |
| EP | 0799649 | A1 | 10/1997 |
| EP | 0149712 | A2 | 7/1998 |
| EP | 0874337 | A1 | 10/1998 |
| EP | 0896304 | A2 | 2/1999 |
| EP | 0914875 | A2 | 5/1999 |
| EP | 0914875 | A3 | 5/1999 |
| EP | 0919965 | A2 | 6/1999 |
| EP | 0983801 | A2 | 3/2000 |
| EP | 0983801 | A3 | 3/2001 |
| EP | 1149712 | A1 | 10/2001 |
| ES | 529535 | | 6/1983 |
| ES | 529536 | | 6/1983 |
| ES | 2006400 | | 4/1989 |
| ES | 2006401 | | 4/1989 |
| GB | 642892 | A | 9/1950 |
| GB | 2075918 | A | 11/1981 |
| GB | 2222712 | B | 3/1990 |
| GB | 2230373 | A | 10/1990 |
| GB | 2295775 | A | 12/1996 |
| GB | 3328311 | | 2/1999 |
| GB | 23282311 | A | 2/1999 |
| JP | 02235744 | | 9/1990 |
| JP | 04132672 | | 5/1992 |
| WO | WO85/02250 | A1 | 5/1985 |
| WO | WO91/17529 | | 11/1991 |
| WO | WO 98/03910 | | 1/1998 |
| WO | WO 98/40138 | | 9/1998 |
| WO | WO 99/09364 | A1 | 2/1999 |
| WO | WO 99/26204 | | 5/1999 |
| WO | WO 99/39312 | | 8/1999 |
| WO | WO00/00256 | | 1/2000 |
| WO | WO00/78418 | A1 | 12/2000 |
| WO | WO01/4460 | A2 | 11/2001 |
| WO | WO01/93966 | A1 | 12/2001 |
| WO | WO02/056266 | A1 | 7/2002 |
| WO | WO 2005/041132 | | 5/2005 |

OTHER PUBLICATIONS

Wikipedia, "Boggle". Dec. 7, 2004. www.web.archive.org/web/20041217033149/http://en.wikipedia.org/wiki/Boggle. Obtained Aug. 1, 2007.*

'Are You In?', (Article).

'Beginner's Guide—How To Bet', (www.plimico.com/How+to+wager/beginnersguide/), (Internet Article), 3 Pgs.

Chip Brown, 'Austin American-Statesman', (Article), May 28, 1998, 2 Pgs., Texas.

John C. Hallyburton, Jr., 'Frequently Asked Questions About Keno', (Internet Article), 1995, 1998, 10 Pgs., (http://conielco.com/faq/keno.html).

'Horse betting Tutorial—Types of Bets' (www.homepokergames.com/horsebettingtutorial.php), (Internet Article), 2 Pgs.

Judith Gaines, 'Pool Party Betting Business Booming Throughout Area Workplaces', (Internet Article), Mar. 19, 1994, 2 Pgs., Issue 07431791. Boston Globe, Boston, MA.

'Maryland Launches Let It Ride', (Internet Article), Circa 2001, 1 Pg.

'Notice of Final Rulemaking', (Internet Article) Mar. 24, 2000, 10 Pgs., vol. 6, Issue #13, Arizona Administrative Register, Arizona.

'How To Play Megabucks', (Internet Article), Mar. 9, 2001, 2 Pgs., Oregon Lottery Megabucks, (http://www.oregonlottery.org/mega/m_howto.htm).

'How To Play Megabucks', (Internet Article), May 8, 2001, 2 Pgs., Oregon Lottery Megabucks, (http://www.oregonlottery.org/mega/m_howto.htm).

'Oregon Lottery', (Internet Article), Apr. 30, 2004, 9 Pgs., Oregon Lottery Web Center, (http://www.oregonlottery.org/general/g_hist.shtml).

'Powerball Odd & Prizes', 'How to Play Powerball', (Internet Article), Dec. 2002, 2 Pgs., (www.powerball.com/pbhowtoplay.shtm).

'Powerball Prizes and Odds', (Internet Article), 2 Pgs., http://www.powerball.com/pbprizesNOdds.shtm.

'Learn To Play the Races' (Internet Article), 15 Pgs., Racing Daily Form (www.drf.com).

Mike Parker, 'The History of Horse Racing' (Internet Article), 1996, 1997, 1998, 5 Pgs., http://www.mrmike.com/explore/hrhist.htm.

EPO Search Report, Jul. 1, 2008.

* cited by examiner

| | | | | | | | | | | | |
|---|---|---|---|---|---|---|---|---|---|---|---|
| AARDVARK | 100 | ANCIENT | | BANQUET | 5 | BOTTOM | | CANDID | | CLERICAL | 10 |
| ABSTRACT | 10 | ANGLE | | BARBEQUE | 10 | BOUNTY | | CANNON | | CLOG | |
| ABSURD | | ANIMAL | | BARGAIN | 5 | BOXCAR | | CANOPY | | CLOTHES | 5 |
| ACADEMIC | 10 | ANNUAL | | BARNYARD | 10 | BOXERS | | CANTEEN | | CLUE | |
| ACCURATE | 10 | ANNUITY | 5 | BASENJI | 5 | BRANDY | | CANYON | | COAX | |
| ACCUSTOM | 100 | ANTIQUE | | BASH | | BREATHE | | CAPTION | | COCKATOO | 100 |
| ACHIEVE | 5 | APPOINT | 10 | BATTERY | 10 | BRISKET | 5 | CAPTURE | 5 | COFFEE | |
| ACQUIRE | | APPROACH | 100 | BECOME | | BROWNIE | | CARAMEL | 5 | COLLAR | |
| ACROBAT | 5 | AFRICOT | | BEDTIME | 5 | BUFFET | | CAREFUL | 5 | COLOGNE | 5 |
| ACROSS | | ARGUE | | BENEFIT | | BULLET | | CARIBOU | 5 | COLORFUL | 100 |
| ACTRESS | 5 | ARMCHAIR | 10 | BIND | | BULLFROG | 100 | CASH | | COLT | |
| ACTUAL | | ARMOIRE | | BLANKET | 5 | BUNDLE | | CASSETTE | 10 | COLUMN | |
| ADAPTER | | ARRANGE | | BLINTZ | | BURGER | | CAST | | COMEBACK | 100 |
| ADMIRAL | 5 | ASSEMBLY | 10 | BLIP | | BURGUNDY | 100 | CATALOG | 10 | COMEDY | |
| ADOBE | | ASSIGN | | BLIZZARD | 100 | BURRITO | 5 | CAVIAR | | COMMON | 10 |
| ADVANCE | 5 | ATTACH | | BLOT | | BUSHEL | | CEILINGS | | COMMUTER | 10 |
| ADVISER | | ATTACK | | BLOWFISH | 10 | CABARET | 5 | CENSUS | | COMPARE | 5 |
| AFFORD | | AUBURN | | BLOWHOLE | 100 | CABOOSE | 5 | CHAMPION | 10 | COMPOSER | 10 |
| AFTER | | AVERT | | BLUE | | CALAMARI | 10 | CHARIOT | | COMPOSES | 100 |
| AIRFARE | | AVOCADOS | 10 | BLUR | | CALAMITY | 10 | CHEESE | | COMPOUND | 100 |
| AIRPORT | | BACKLASH | 100 | BOBCAT | | CALF | | CHIPMUNK | 100 | COMPRESS | 10 |
| AIRTIME | | BACKYARD | 100 | BOGGLE | | CALICO | | CHORUS | | COMRADE | |
| ALFALFA | 10 | BAMBOO | 5 | BOLT | | CALM | | CIRCUS | | CONCLUDE | 10 |
| ANACONDA | 10 | BAND | | BORDER | | CAMPUS | | CITIZEN | 5 | CONFIDE | |
| ANATOMY | 5 | BANDANNA | 100 | BOTTLE | | CANARY | | CLAN | | CONFINE | 5 |

FIG. 1A

| | | | | | | | | | | | |
|---|---|---|---|---|---|---|---|---|---|---|---|
| CONFLICT | 10 | CROUTON | 5 | DORM | | ESPRESSO | 100 | FOOTSTEP | 10 | GLOW | |
| CONSULT | 10 | CROW | | DOWN | | EVENING | 5 | FOOTWORK | 100 | GOLF | |
| CONSUME | 5 | CUISINE | 5 | DOWNTOWN | 100 | EXCHANGE | 10 | FOREMAN | | GOODWILL | 10 |
| CONTAIN | | CULT | | DRAB | | EXPERT | | FORGIVE | | GOOFBALL | 100 |
| CONVERT | | CURTAIN | | DRAW | | EXPLAIN | 5 | FORM | | GORGEOUS | 10 |
| CONVOY | | CUSTARD | 5 | DRIP | | EXPLICIT | 10 | FORTUNE | | GORILLA | 5 |
| COOKBOOK | 100 | CUSTOM | | DROP | | EXPORT | | FOSSIL | | GOURMET | |
| COOL | | DARKROOM | 10 | DRUM | | FAREWELL | 10 | FOUR | | GRADE | |
| COPPER | | DAUBIER | | DRUMROLL | 100 | FAST | | FREEZE | | GRAFFITI | 10 |
| CORNICE | 5 | DAWN | | DUCKLING | 10 | FEATURE | | FROM | | GRAIN | |
| CORRIDOR | 10 | DEFAULT | | DUCT | | FEEDBACK | 10 | FUEL | | GRANITE | |
| COSMETIC | 10 | DEFEND | | DUMBBELL | 100 | FERRET | | FUND | | GRANOLA | |
| COSMIC | | DENTIST | | DUTY | | FIDDLE | | FURNACE | 5 | GRAVITY | 5 |
| COTTAGE | 5 | DEVELOP | 10 | EARNEST | | FIND | | FUSE | | HALT | |
| COTTON | | DIAGRAM | 5 | EARTH | | FIREMAN | | GALAXY | | HAND | |
| COUGAR | | DIALECT | | EASTERN | | FIST | | GELATIN | | HANDBOOK | 10 |
| COUPLE | | DIAMOND | 5 | EFFORT | | FIXTURE | 5 | GENERAL | | HANDMADE | 10 |
| COUPON | | DIMINISH | 100 | ELEMENT | 5 | FLAN | | GENERIC | | HANDYMAN | 100 |
| COWBOY | 5 | DISK | | ELEVEN | | FLAT | | GESTURE | | HARBOR | |
| COWORKER | 10 | DISTINCT | 10 | EMERALD | | FOLLOW | 5 | GIANT | | HARD | |
| COYOTE | | DOCTOR | | EMOTION | | FOND | | GLACIER | | HEART | |
| CRATE | | DOMINO | | EMPLOY | | FOOD | | GLAD | | HEDGEHOG | 100 |
| CRIMSON | 5 | DONKEY | | EMPLOYEE | 10 | FOOL | | GLARE | | HELD | |
| CRINKLE | 5 | DOORBELL | 10 | ENSEMBLE | 10 | FOOTBALL | 10 | GLITTER | | HIND | |
| CRITTER | 10 | DOORKNOB | 100 | EQUATOR | | FOOTNOTE | 10 | GLOB | | HOAX | |

FIG. 1B

| | | | | | | | | | | | |
|---|---|---|---|---|---|---|---|---|---|---|---|
| HOCKEY | | JANITOR | | LOCKER | | MIND | | NECKTIE | 5 | PAST | |
| HOMEBODY | 10 | JEEP | | LOCUST | | MINER | | NEPHEW | | PATIENT | |
| HOMEMADE | 10 | JOKE | | LOOM | | MINERAL | | NETWORK | 5 | PATTERN | |
| HOMEROOM | 100 | JOURNAL | 5 | LOOP | | MINNOW | | NICKNAME | 10 | PAYMENT | 5 |
| HOMESICK | 10 | JOURNEY | 5 | LOZENGE | 5 | MIRROR | | NOSY | | PEBBLE | 5 |
| HOMEWORK | 10 | JUDO | | LUAU | | MISMATCH | 100 | NOTEPAD | | PEEK | |
| HONEYBEE | 10 | JUNKYARD | 100 | LUMBER | | MIST | | NOWHERE | | PENDED | |
| HONEYBUN | 10 | JUTE | | MACHINE | 5 | MISTAKE | 5 | NUMERIC | 5 | PENDULUM | 10 |
| HONORARY | 10 | KEEP | | MAGENTA | | MIXTURE | 5 | NUZZLE | 5 | PENGUIN | 10 |
| HOOD | | KEPT | | MAHOGANY | 10 | MOLECULE | 10 | OATMEAL | | PEOPLE | |
| HOODWINK | 10 | KNEW | | MARINARA | 10 | MOLT | | OBJECT | | PERK | |
| HORSEFLY | 10 | KNIT | | MARJORAM | 100 | MOM | | OFF | | PETUNIA | |
| HOST | | KNOT | | MAST | | MONGOOSE | 10 | OFTEN | | PHARMACY | 100 |
| HOTDOG | | LANDMARK | 10 | MATCHBOX | 100 | MONITOR | | OKAY | | PHYSICAL | 10 |
| HUBCAP | 5 | LANTERN | | MATINEE | | MONUMENT | 10 | OLIVE | | PHYSIQUE | 10 |
| ICEBERG | 5 | LAUNCH | | MECHANIC | 10 | MOOD | | ONLY | | PIANO | |
| IMAGINE | | LAWN | | MEDIA | | MOTH | | OPTIMIST | 10 | PICTURE | 5 |
| IMPROVE | 5 | LEAFLET | 10 | MEEK | | MUFFIN | 5 | ORGAN | | PINPOINT | 10 |
| INCLUDE | | LEASE | | MELD | | MULBERRY | 10 | OTHER | | PIPE | |
| INDOORS | | LEOPARD | | MEMBRANE | 10 | MULE | | OUTSIDE | | PLAN | |
| INFINITY | 100 | LICENSE | | MEMORY | | MUMBLE | 5 | OXYGEN | | PLOT | |
| INSTANT | 5 | LIFT | | MERMAID | 5 | MUSCLE | | PAGEANT | | PLUNGE | |
| INSTEAD | | LIMERICK | 10 | MIDDLE | | MUSE | | PAMPHLET | 100 | PODIUM | |
| ITALICS | 5 | LITTLE | | MIDTOWN | 5 | NAPKIN | | PANTING | 5 | POLISH | |
| JAGUAR | | LOBSTER | | MIME | | NECK | | PARLOR | | POLLEN | |

FIG. 1C

| | | | | | | | | | | | |
|---|---|---|---|---|---|---|---|---|---|---|---|
| POLO | | PURPLE | | REPLACE | 5 | SEASHELL | 10 | SKETCH | | SPONGY | |
| PONCHO | | PYTHON | | REQUEST | 5 | SELF | | SKID | | SPOT | |
| POND | | QUANTITY | 10 | REQUIRE | 10 | SEMINAR | | SKY | | SPUR | |
| PONY | | QUARTER | 5 | RESIDUE | | SENATOR | | SLENDER | | SQUASH | 5 |
| POODLE | | QUARTET | 5 | RETREAT | 5 | SEQUEL | | SLUG | | SQUINT | |
| POST | | QUARTZ | | REUNITE | | SEQUENCE | 10 | SMOG | | SQUIRM | |
| POSTAGE | | QUENCH | | REVENUE | 5 | SERVANT | | SNAIL | | SQUIRT | |
| POSTPONE | 10 | QUICHE | | RITZ | | SERVICE | 5 | SNEEZE | | STAB | |
| POTATO | | QUINTET | 5 | ROBUST | | SHADOW | | SNIP | | STAGE | |
| POUR | | RAGTIME | | ROMANCE | | SHED | | SNOB | | STAY | |
| POUT | | RAINBOW | | ROMP | | SHEPHERD | 100 | SNOW | | STOP | |
| PRECISE | 5 | RANK | | ROOK | | SHIN | | SNUB | | STOURY | |
| PRESERVE | 10 | RASCAL | | ROOSTER | | SHORTCUT | 10 | SOAK | | STOW | |
| PRETTY | | RASH | | RUBBLE | | SHOT | | SOAKAGE | 5 | STUB | |
| PRINTER | | RASP | | RUNG | | SHOVEL | | SOCIETY | | STUBBORN | 10 |
| PRODUCE | 5 | RAVEN | | RUSH | | SHREWD | | SOFT | | STUDENT | 5 |
| PROM | | RAVIOLI | | RUSTIC | | SHRIMP | | SOMEONE | 5 | STUPID | |
| PROMISE | | REACT | | SALIVA | | SIDEKICK | 100 | SONGBOOK | 100 | SUBURBAN | 100 |
| PROMPT | 5 | REALITY | | SALTINE | | SIDESHOW | 10 | SOPRANO | 5 | SUCCESS | 10 |
| PROPEL | | RECEIPT | | SALTIRE | | SIFT | | SPAN | | SUDDENLY | 10 |
| PROPER | | RECEIVE | 5 | SAMPLER | 5 | SIGNAL | | SPAR | | SUMMIT | |
| PROSPECT | 10 | RECOUNT | | SANDAL | | SILENCE | | SPECIAL | | SUMMON | |
| PUDDLE | | REGIMEN | | SCISSORS | 100 | SILK | | SPEECH | | SUNRISE | |
| PUEBLO | | RELEASE | | SCORCH | 5 | SIMPLE | | SPIN | | SURF | |
| PULLEY | | REMEDY | | SEAFOOD | | SINCERE | | SPLASH | 5 | SURFACE | 5 |

FIG. 1D

| | | | | | | | |
|---|---|---|---|---|---|---|---|
| SURGEON | | THEATER | | TRIVIAL | | WEEK | |
| SURROUND | 10 | THEOREM | | TROLLEY | 5 | WELD | |
| SURVEY | | THIS | | TUBA | | WESTERN | |
| SURVIVOR | 100 | THUNDER | | TWINE | | WILDCAT | 10 |
| SUSPENSE | 100 | TIARA | | TWINKLE | 5 | WILT | |
| SWAN | | TICKLE | | TYKE | | WIND | |
| SWAT | | TIDY | | UMBRELLA | 10 | WINDMILL | 100 |
| SWEATER | | TOASTER | | UPON | | WINDOW | |
| SWIMSUIT | 100 | TOFU | | UTENSIL | | WINGSPAN | 10 |
| SYLLABUS | 100 | TOMORROW | 100 | VACUUM | 10 | WOOD | |
| SYMBOL | | TOOK | | VARIETY | | WOODWORK | 100 |
| SYMPATHY | 100 | TOSTADA | 5 | VARSITY | 5 | WOOL | |
| SYMPHONY | 100 | TOURISM | | VAST | | WORD | |
| SYSTEM | | TOURIST | | VENISON | | WORM | |
| TADPOLE | | TOWER | | VENTURE | | WOW | |
| TAKEOUT | 5 | TRACE | | VIADUCT | 10 | WRINKLE | 5 |
| TANK | | TRAILER | | VIBRATE | | YARD | |
| TATTOO | | TRANSIT | | VIRTUAL | | YELLOW | |
| TAUT | | TRAPEZE | 5 | VOLLEY | | YOUR | |
| TEAROOM | | TREAT | | VOLT | | YOUTHFUL | 100 |
| TENDENCY | 10 | TRIBE | | VOLUME | | ZEST | |
| TENSE | | TRIBUNE | | WALRUS | | | |
| TERMITE | | TRIBUTE | 5 | WAND | | | |
| TERRACE | | TRICEPS | 5 | WARD | | | |
| TEXT | | TRILOGY | 5 | WASHROOM | 10 | | |

FIG. 1E

| Points | Prizes |
|---|---|
| 3-24 | $10 |
| 25-99 | $100 |
| 100-199 | $500 |
| 200+ | $200,000 |

FIG. 4

| | | | |
|---|---|---|---|
| A:7.7% | B:1.7% | C:2.6% | D:4.3% |
| E:12.4% | F:2.4% | G:2.1% | H:5.7% |
| I:7.3% | J:0.1% | K:0.6% | L:3.4% |
| M:2.9% | N:7.4% | O:7.8% | P:2.1% |
| Q:0.1% | R:6.0% | S:6.0% | T:9.2% |
| U:2.7% | V:1.1% | W:2.2% | X:0.2% |
| Y:1.9% | Z:0.1% | | |

Fig. 11

$5.00

Money Words

| | | |
|---|---|---|
| APPLE | GRAIN | PAIR |
| BANANA | GUITAR | PEANUT |
| BANJO | HAIR | PECAN |
| BISCUIT | HONEY | PEPPER |
| BOXER | LADYBUG | SHARK |
| BRAIN | LEMON | TOMATO |
| CAKE | LETTUCE | TRAIN |
| CART | MINER | TULIP |
| CHERRY | MINT | VENT |
| CROW | OLIVE | WALNUT |
| DANCER | ONION | WOLF |
| EARTH | PAINTER | ZEBRA |

A B C D E H I
L M N R S T Z

Fig. 7

| Completed Words | Prize | 1/Probability |
|---|---|---|
| 5 | $7 | 8.6 |
| 6 | $10 | 14.6 |
| 7 | $20 | 30.6 |
| 8 | $50 | 95.5 |
| 9 | $100 | 306.3 |
| 10 | $500 | 2,952.7 |
| 11 or more | $5,000 | 20,640.4 |

Fig. 8

| Completed Words | Prize | 1/Probability |
|---|---|---|
| 6 | $7 | 11.3 |
| 7 | $10 | 23.4 |
| 8 | $50 | 109.0 |
| 9 | $500 | 1,227.6 |
| 10 or More | $100,000 | 99,382.8 |

WORD-BASED LOTTERY GAME

CROSS REFERENCE TO RELATED APPLICATION

This application claims the benefit of U.S. Provisional Application No. 60/645,795, Word-based Lottery Game, filed on Jan. 21, 2005, the entirety of which is incorporated herein by this reference.

BACKGROUND OF THE INVENTION

1. Field of the Invention

The invention relates in general to lottery game methods. More particularly, the invention relates to an on-line lottery wagering game.

2. Description of the Related Art

Lotteries and lottery theory are well known in the art. Generally a prize is awarded when an assigned or chosen series of numbers is matched with corresponding numbers that have been randomly chosen. Most lotteries are based on numbers. Lotteries also incorporate other indicia, such as letters in a superficial way. What would be interesting would be a lottery game that incorporated letters in a meaningful way, such as a lottery game for which drawn letters form words and prizes are based thereon.

Therefore, it is to a word-based lottery game for which randomly drawn letters are used to form words and for which prizes are awarded that the present invention is primarily directed.

SUMMARY OF THE INVENTION

In one embodiment, there is provided a method for playing a word-based lottery game. The game comprises receiving a plurality of player indicia from a player, randomly generating one or more game indicia, forming a plurality of words using the plurality of player indicia and the game indicia, comparing the plurality of words with a list of predefined words, and awarding a prize to the player according to a comparison result.

In another embodiment, there is provided a method for playing a word-based lottery game. The game comprises assigning a plurality of words to a player, each word being assigned a point value, randomly generating game indicia, summing the point values for the words that can be formed with the randomly generated game indicia, and awarding a prize based on that total.

In another embodiment, there is provided a system for playing a word-based lottery game. The system comprises a communication network, at least one gaming machine in communication with the communication network, and a server in communication with the at least one gaming machine through the communication network. The server hosting the lottery game is capable of receiving a plurality of player indicia from a player, generating one or more game indicia, forming a plurality of words using the plurality of player indicia and the game indicia, comparing the plurality of words with a list of predefined words, and awarding a prize to the player according to a comparison result.

In yet another embodiment, there is provided yet another method of playing a word-based lottery game. The method comprises receiving a plurality of cells from a player, populating a ticket with numbers and symbols, matching the plurality of cells from the player with the ticket populated with letters and symbols, and issuing the ticket with a list of numbers and symbols matched to the plurality of cells to the player.

Other objects, features, and advantages of the present invention will become apparent after review of the Brief Description of the Drawings, Detailed Description of the Invention, and the Claims.

BRIEF DESCRIPTION OF THE DRAWINGS

FIGS. 1A-1E illustrate an word list according to one embodiment of the invention.

FIG. 4 illustrates a sample prize table.

FIG. 7 illustrates a ticket composed of a set of words and a randomly produced set of letters.

FIG. 8 illustrates a prize table for the ticket in FIG. 7, wherein prizes are awarded based on the number of words that can be formed with the given letters.

FIG. 11 is a distribution table of letters independently and randomly generated for the lottery game.

DETAILED DESCRIPTION OF THE INVENTION

In brief description, the present invention is a method for a word-based lottery game that allows a player to blindly select a series of letters as game indicia and a lottery authority conducts a lottery drawing comprising a random pick of a group of letters. The lottery authority has created in advance a list of prize words with various point values weighted for each prize word based upon the likelihood of formation from randomly-drawn letters, or other predetermined odds. A win is determined by the combination of the player-selected letters and the lottery-picked letters to form words, and the player is then awarded winnings based upon the total points of all prize words from the list of prize words that are created in the combination. The player selection process is blind, meaning that though the player determines through some process the series of letters, he does not know in advance what these letters are. So it is the case that the player's selection is effectively random. Therefore the player's selection, the lottery's selection, and the combination of the two can be assigned probabilities of occurrence. In some embodiments, the player providing indicia is omitted and only the letters randomly produced by the lottery are used to form words.

Figure 2:
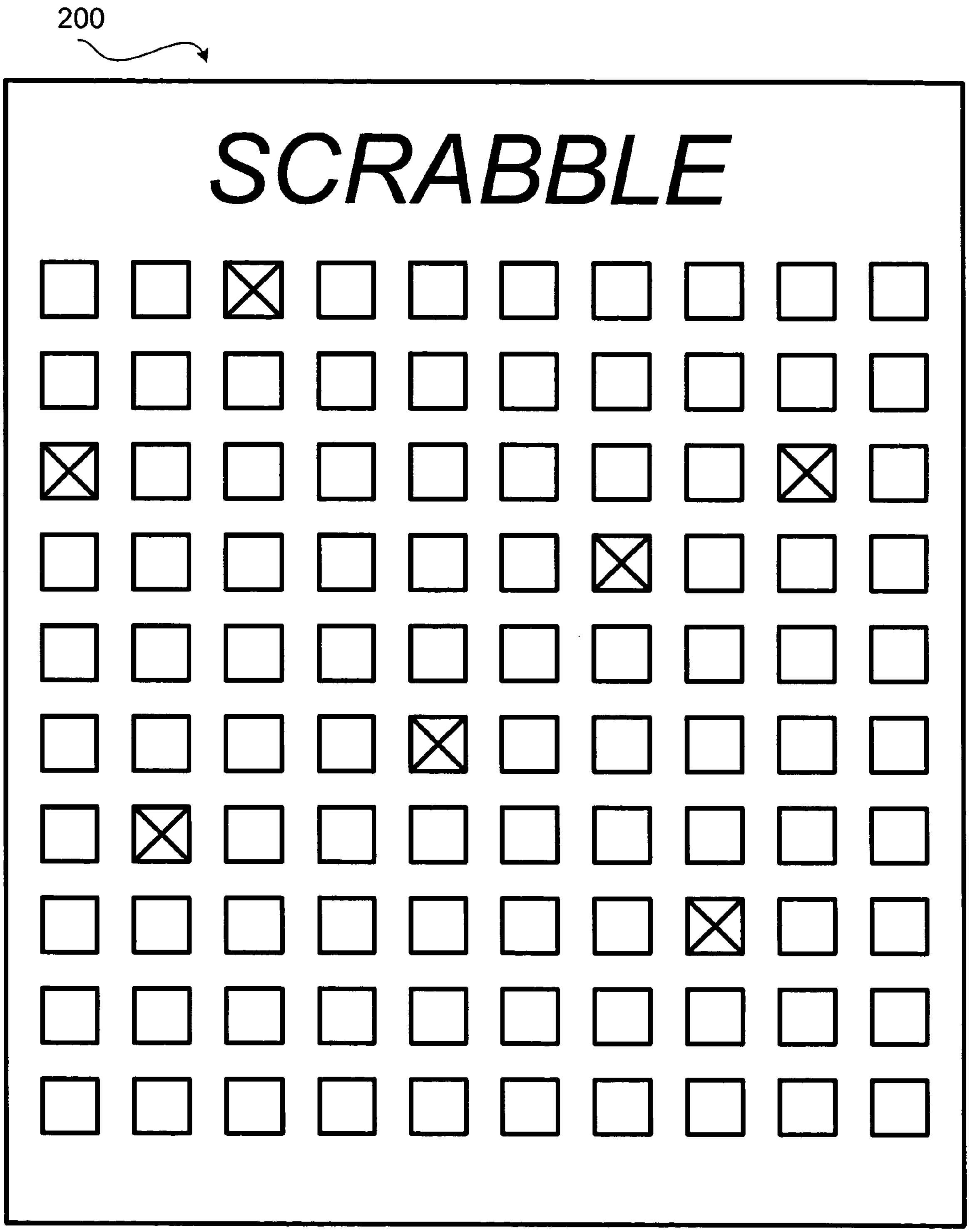
FIG. 2 illustrates a sample playslip with a player selection.

In one embodiment, the set of words is a sample list of 696 words, as illustrated in FIGS. 1A-1E. Those skilled in the art will appreciate that lists with other words may also be used. The draw is a composite event. The first part of the event is that of the player blindly selecting seven tiles (indicia) from a playslip 200 illustrated in FIG. 2 by marking 7 cells on the playslip 200. The playslip 200 has 100 cells; each cell is associated with either a letter or a special symbol, such as a wildcard symbol. The letters and symbols will be revealed on the ticket issued to the player. The second part of the event is that of the lottery drawing one letter (game indicia) out of 26 letters in the alphabet. This part of the draw applies to all players. The outcome is that of the letters blindly selected by the player plus the letter the lottery randomly drew form a total of 8 "characters." The odds for such a game can be computed as if the draw were a single event, i.e., 8 letters being randomly drawn.

Figure 3:
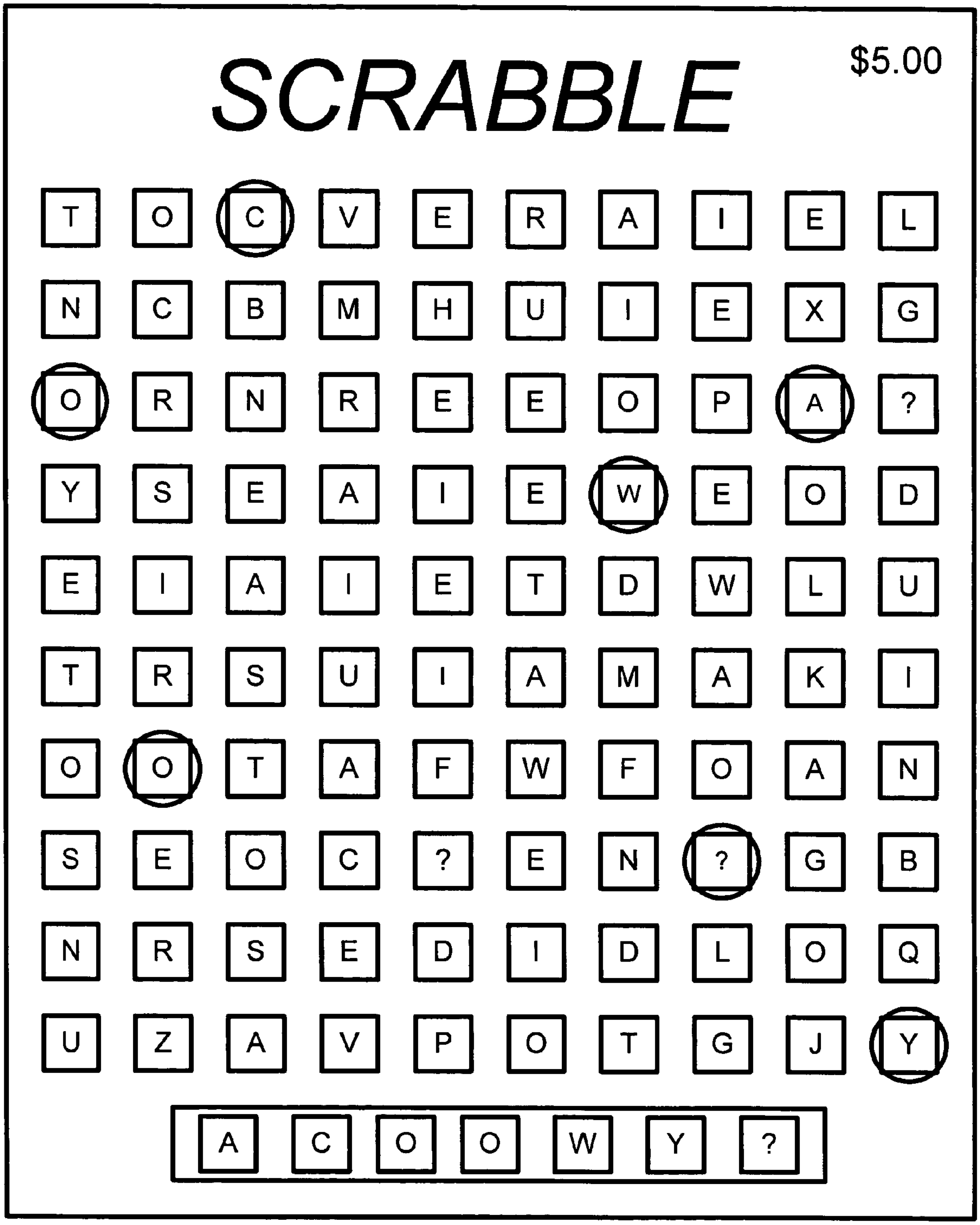
FIG. 3 illustrates a sample ticket with a player selection.

After the player makes the selection and purchases a ticket, the ticket is issued to the player. FIG. 3 illustrates an exemplary ticket 300 with player selection. Among the symbols in the ticket 300, there is a "?" that is a wildcard symbol and can be used in place of any letter. The ticket 300 also illustrates that the player may have selected a letter, such as "L," more than once. The player will use the letter he selected and the letter drawn by the lottery to form words for comparison with the list of prize words. For example, for the ticket 300, the player's selection is "A C O O W Y ?," where "?" is a wildcard symbol and can replace any letter. The rule for forming words is simple: each letter, including the letter drawn by the lottery, can be used at most once and not all of the letters need to be in a word. For example, if the lottery draws "N," the words on the list of words that can be formed by seven letters (A C O O W Y N) and one wildcard symbol (?) are CLAN, DAWN, LAWN, SWAN, WAND, WOW, DOWN, NOSY, ONLY, SNOW, CROW, PONY, COAX, OKAY, COOL, WOOD, WOOL, CANOPY, CANYON, CONVOY, and COWBOY. One point is awarded to the player for each word. In this example, 21 points are awarded to the player. Other words, such as COOK, formed by the letters and wildcard symbol but not on the list do not earn any point for the player.

Besides awarding points for each matching word, bonus points may be assigned to select words. In the list of words shown in FIGS. 1A-1E, can be seen bonus points assigned to certain words. For example, in FIG. 1A, word "aardvark" is assigned 100 bonus points, and word "abstract" is assigned 10 bonus points. It is noted that not all words are assigned bonus points, for example, word "absurd" is not assigned any bonus point.

The particular set of 21 words in the above example includes a word (COWBOY) with 5 bonus points assigned to it. Therefore, the player would be awarded a score of 26 points (21 matches and 5 bonus points). According to the prize table illustrates on FIG. 4, the player would win $100. The overall odds of winning for the exemplary embodiment are 1 in 4.9 and return would be 61.8%.

To determine the return to the player for such a game it is necessary to know the probabilities associated with each of the prize tiers. As an example, one can compute the probability for winning a prize of $100 as follows. By the prize table, a prize of $100 is awarded for scores of at least 25 and less than 100. A computer program cycles through all the possible outcomes (i.e., the player blindly selected letters and the lottery drawn letter) and identifies those for which the score is at least 25 and less than 100 as successes. For example, the score for player's selection "A C O O W Y ?" and the lottery draw "N" is 26 points and is identified as one such outcome.

The probabilities for these individual outcomes considered successes are computed. For example, the probability of the aforementioned outcome is (using basic probability theory):

$$(9\times2\times(8\times7/2)\times2\times2\times2)/(100\times99\times98\times97\times96\times95\times94)\times 1/26=0.0000000096877297556$$

The sum of the probabilities for these outcomes is totaled. In this case, the sum is 0.010 to the nearest thousandth. That is, the probability of winning a prize of $100, which is the probability that an outcome can format least 25 but no more than 99 words on the list, which is the sum of the probabilities of individual outcomes each comprising 7 player blindly selected letters and the lottery's one selected letter, is 1.0%.

Figures 9, 10:
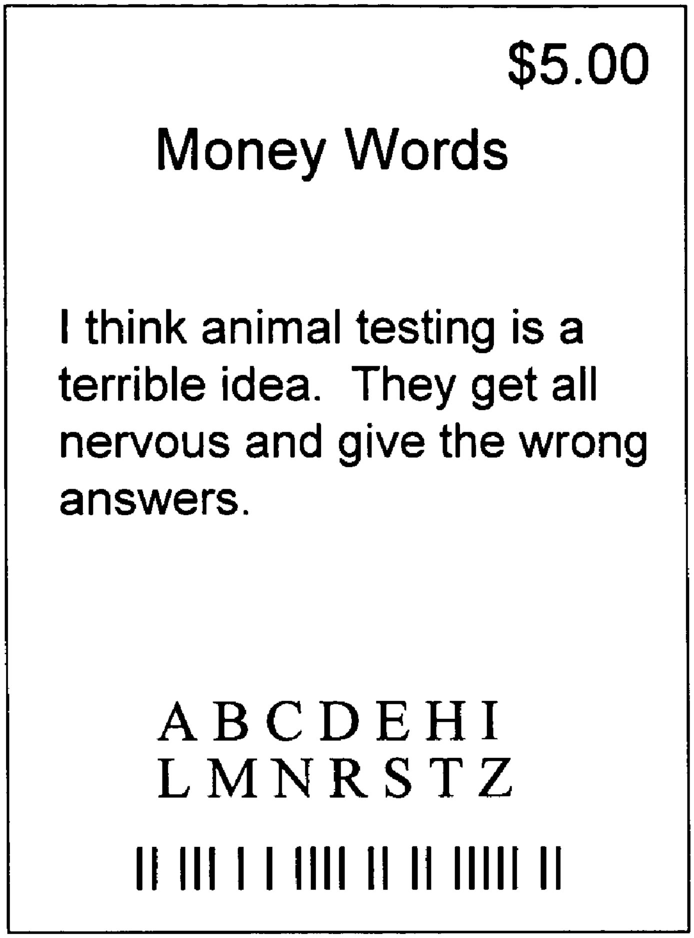
FIG. 9 illustrates a ticket composed of a set of words and a randomly produced set of letters, wherein the set of words form sentences.
FIG. 10 illustrates a prize table for the ticket in FIG. 9 wherein prizes are awarded based on the number of words that can be formed with the given letters.

FIG. 7 illustrates a simplified version of the current invention. A ticket costs $5. The player component of the letter-selection process is omitted. The player does not select any letters, blindly or otherwise. Instead, the player is assigned a set of words. A set of letters is randomly produced and displayed at the bottom of the ticket. Prizes are based on the number of words that can be formed by these letters, as opposed to prizes being assigned to individual words. This is equivalent to each word being assigned a score of 1 and the prize being based on the total score. There are 36 words on the ticket. The set of words is produced by some random process, independently of the set of words. In this example, the 14 letters are randomly produced equivalent to the following process: 14 letters are independently and randomly generated based on the distribution in FIG. 11 with replacement. A set of letters is rejected if there are any repeated letters or if the set of letters does not contain all of the letters A E I N R T or if the set of letters contains a Q without a U. The official draw is the first set of letters produced that is not rejected. This random selection of letters occurs at the time of the purchase and is printed on the ticket under the 36 words. Those skilled in the art of mathematics can confirm that given a positive integer n, a probability can be assigned to the event that a set of letters produced by the described process can be assigned a probability. Therefore, a prize table can be derived as in FIG. 8, for which prizes are based on the number of words that can be formed with the letters. For example, for the ticket in FIG. 7, the player is able to form the words BANANA, BRAIN, CART, DANCER, EARTH, HAIR, MINER, MINT, TRAIN and ZEBRA, with the drawn letters A B C D E H I L M N R S T Z. By the prize table in FIG. 8, the player is awarded $500. The inverse probabilities in FIG. 8 are correct and mathematicians can verify that the return is 68.2% for this ticket. Another example, of this embodiment is in FIG. 9. Such a ticket costs $5. For this ticket, the words have meaning as a group as they form sentences. The 14 letters are randomly produced based on the above described process. The inverse probabilities of being able to form 6, 7, 8, 9, or 10 or more is illustrated in FIG. 10. Prizes are assigned based on these probabilities. Those skilled in the art of mathematics can confirm that the return for this ticket is 58.4%.

Figure 5:
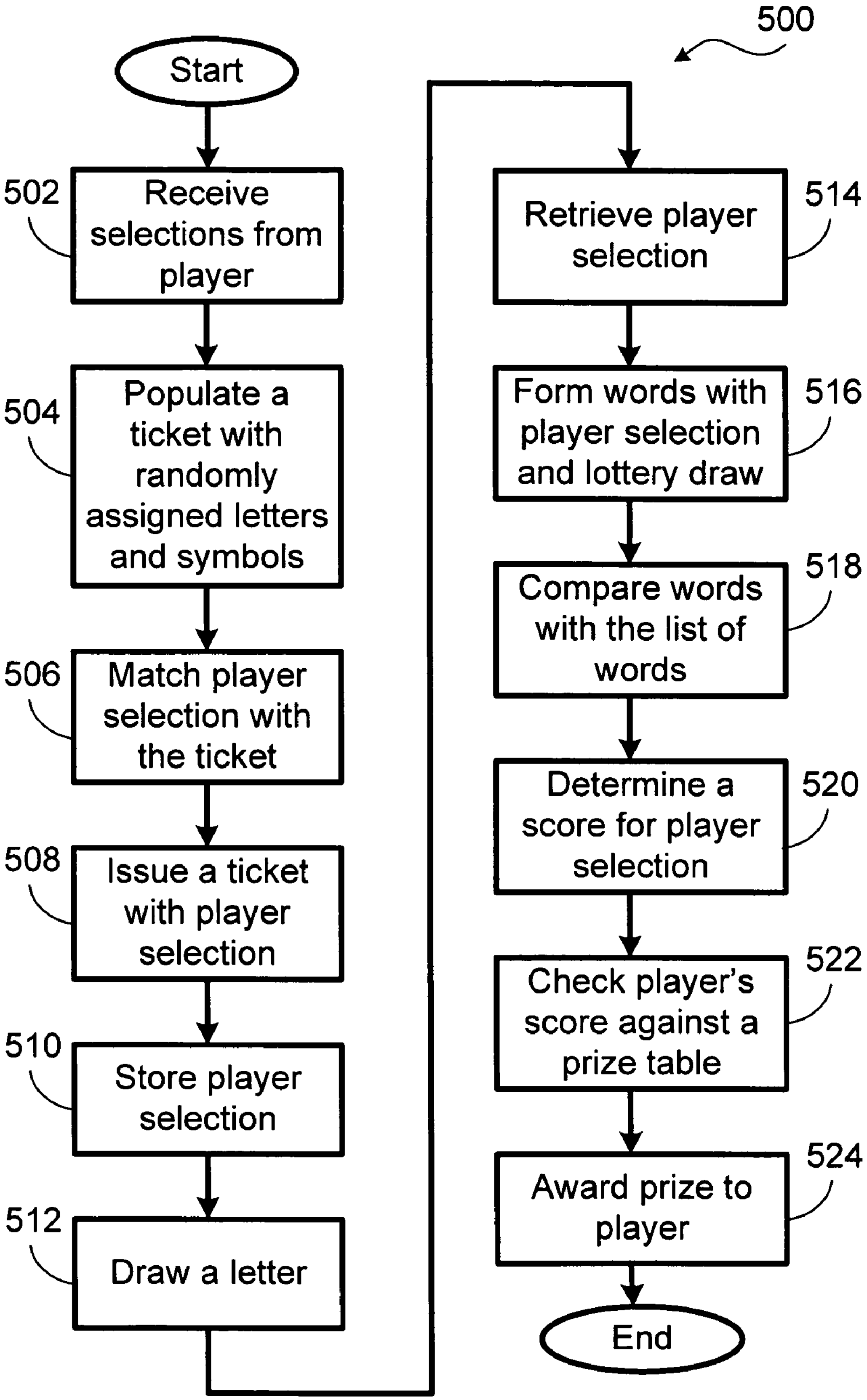
FIG. 5 illustrates a lottery process according to one embodiment of the invention.

FIG. 5 illustrates a lottery process 500 according to one embodiment of the invention. A player marks his selection on a playslip 200 and purchases a lottery ticket 300. The player may purchase the ticket from a standalone lottery station, which may be connected to a lottery server through a communication network. The player's selection is received by the lottery station, step 502, and the lottery station will populate a ticket with random letters and wildcard symbols, step 504. The lottery may set the number of wildcard symbols that can be placed on a ticket. After generating a ticket with random numbers and symbols, the lottery station matches the player selection with the ticket, step 506, and issues a ticket with player selection to the player, step 508. The player selection is stored by the lottery station, either locally or remotely at the lottery server, step 510. The lottery station will send both the player selection along with player's wage information to the lottery server. Alternatively, the player may choose to have the lottery station to randomly pick a set of cells instead of picking them individually.

At a predetermined time, the lottery draws a letter, step 512, which will be sent to the lottery stations and made available to all players. After the lottery's draw is known, the lottery server may retrieve player selection from all the players, step 514, and form words with each player selection and the letter drawn by the lottery, step 516. The lottery server then compares all the words formed with words on the list of words, step 518, and determines a score for each player selection, step 520. The score for the player selection is compared with a prize table, step 522, and if the score is high enough, the player wins a prize, step 524.

Figure 6:
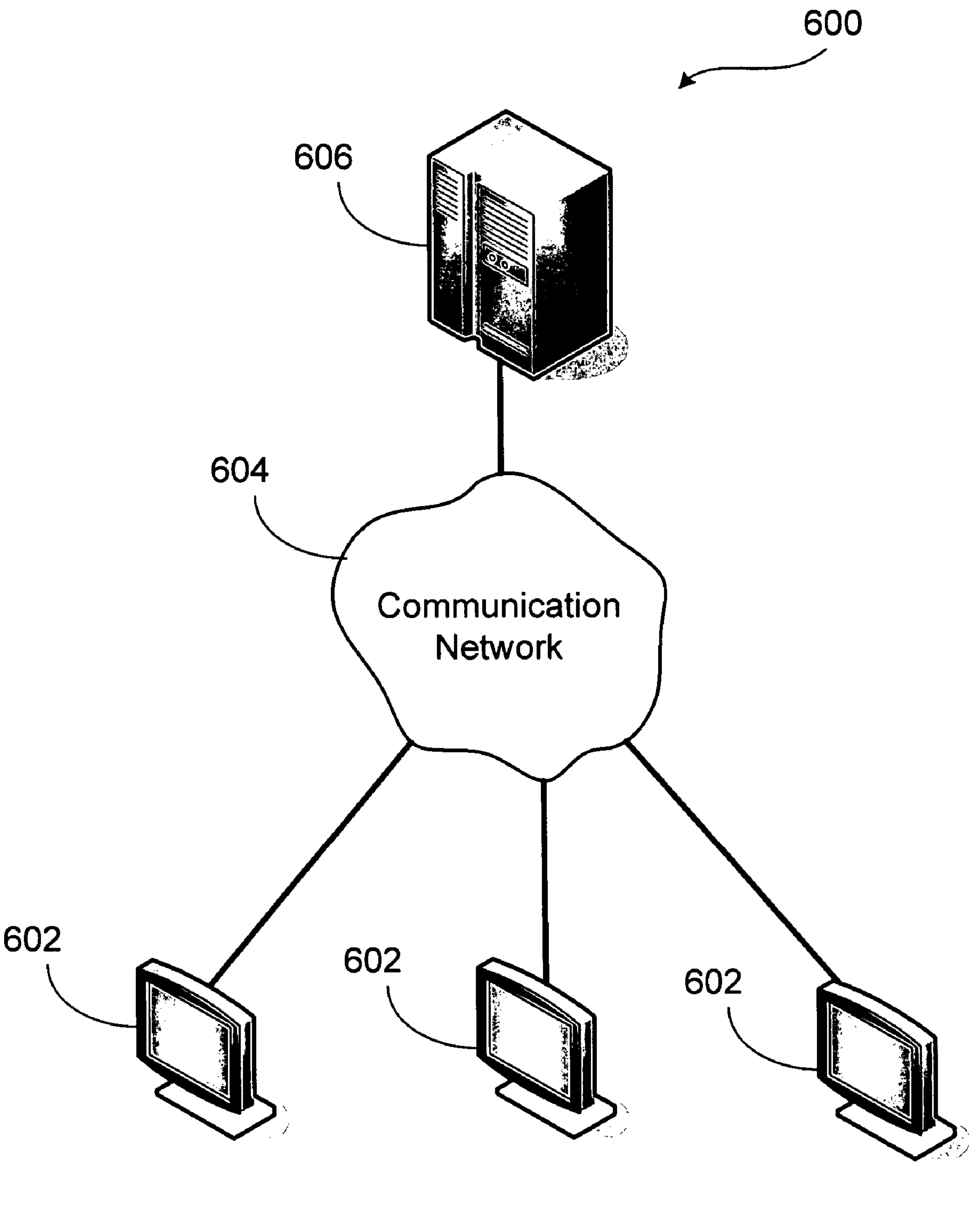
FIG. 6 illustrates a network architecture supporting the present invention.

The invention can be implemented on a standalone lottery station (gaming device) or a lottery server. A standalone lottery station may include a display unit, a scanning unit (also known as a player input device) for scanning playslips containing player selection, and a ticket issuing unit for issuing tickets to players. The lottery station has a controller with a random number generator capable of generating sets of letters for the player. The controller also takes player-selected information, if applicable, from the scanning device and issues a ticket to the player. The controller determines a number of matches for the player's ticket as described above. The lottery station may also be connected to a game server as illustrated in FIG. 6. The lottery station 602 is connected to the server 606 through a communication network 604. In the embodiment illustrated in FIG. 6, each gaming device receives wagers and selections from players, passes betting information to the server 606, and issues tickets to the players. The server 606 receives player selections and determines winners based on the numbers selected by the lottery authority.

Although several preferred embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed herein, and that many modifications and other embodiments of the inventions are intended to be included within the scope of the appended claims. Moreover, although specific terms are employed herein, as well as in the claims, they are used in a generic and descriptive sense only, and not for the purposes of limiting the described invention, nor the claims which follow below.

What is claimed is:

1. A method for conducting a word-based lottery game, comprising the steps of:

having a player designate a plurality of player indicia from a set of hidden indicia, the number of player indicia being less than the number of hidden indicia, and the player indicia remaining unknown to the player;

randomly generating game indicia that is also unknown to the player;

revealing the player indicia and the game indicia to the player;

forming a plurality of words using the plurality of player indicia and the game indicia;

comparing the plurality of words for matches with a list of predefined prize words that is less than all possible words that may be formed from the player indicia and game indicia, each of the prize words having a value assigned thereto; and awarding a prize to the player according to a total value for the matched prize words.

2. The method of claim 1, wherein a nominal base value is assigned for each match between the plurality of words and the list of predefined prize words.

3. The method of claim 2, wherein certain words in the list of predefined prize words have additional bonus value above the nominal value.

4. The method of claim 1, wherein the plurality of player indicia is randomly selected by the player from the set of hidden indicia.

5. The method of claim 1, wherein the step of generating a game indicia further comprises the step of randomly selecting the indicia from a predefined set of indicia that includes letters and wildcard symbols.

6. The method of claim 1 further comprising the steps of:

designating the plurality of player indicia from the set of hidden indicia by the player inputting a selection on a ticket and then randomly populating the ticket with indicia such that the player indicia corresponds to the indicia assigned to the player's selection on the ticket.

7. A system for hosting a word-based lottery game for a plurality of players, comprising:

a communication network;

at least one gaming machine in communication with the communication network; and a server in communication with the at least one gaming machine through the communication network, wherein the server hosting the lottery game is configured for receiving a plurality of player indicia from each of the players, the player indicia selected by the player from a set of hidden indicia that includes any combination of letters and symbols, the number of player indicia being less than the number of indicia in the set of hidden indicia, the player indicia being unknown to the player, randomly generating game indicia that is common to all of the players and also unknown to the players, revealing the respective player indicia and the common game indicia to the players, each of the players forming a plurality of words using the plurality of player indicia and the game indicia, comparing the plurality of words with a limited list of predefined words that is less than all possible words that may be formed from the player indicia and game indicia, each of the predefined words having a value assigned thereto, and awarding a prize to the player according to a comparison result.

8. The system of claim 7, wherein the server assigns a nominal base value for each match between the plurality of words and the list of predefined words.

9. The system of claim 8, wherein certain of the words in the list of predefined words have a bonus value, and the server assigns the bonus value for any matched words between the plurality of words and the list of predefined words.

10. The system of claim 7, wherein the server randomly generates the plurality of player indicia from the set of indicia upon receipt of instructions from the player.

11. The system of claim 7, wherein the server randomly generates the game indicia from a predefined set of letters.

12. The system of claim 7, wherein the server is configured to randomly populate a ticket with the set of hidden indicia, and to recognize a player's selection of player indicia from a player input to the ticket.

13. The method of claim 1, wherein the player designates the plurality of player indicia player by selecting a plurality of cell positions from a set of cell positions on a game ticket, and then randomly populating all of the cell positions on the game ticket with any combination of letters and symbols, the player indicia corresponding to the letters or symbols in the plurality of player-selected cell positions.

* * * * *